United States Patent [19]
Watanabe et al.

[11] Patent Number: 5,457,674
[45] Date of Patent: Oct. 10, 1995

[54] OPTICAL DISC RECORDING APPARATUS

[75] Inventors: Isao Watanabe; Koichi Yamada; Kyosuke Yoshimoto; Kunimaro Tanaka, all of Amagasaki, Japan

[73] Assignee: Mitsubishi Denki Kabushiki Kaisha, Tokyo, Japan

[21] Appl. No.: 755,026

[22] Filed: Sep. 4, 1991

[30] Foreign Application Priority Data

Sep. 4, 1990 [JP] Japan .................................. 2-234680

[51] Int. Cl.[6] .................................................. G11B 7/00
[52] U.S. Cl. .................................. 369/54; 369/48; 369/50
[58] Field of Search .............................. 369/44.26, 44.28, 369/47, 48, 50, 54, 59, 116, 124, 121, 58; 346/76 L; 360/77.04, 78.06, 78.07

[56] References Cited

U.S. PATENT DOCUMENTS

| | | | |
|---|---|---|---|
| 4,611,314 | 9/1986 | Ogata et al. | 369/44.28 |
| 4,747,091 | 5/1988 | Doi | 369/54 |
| 4,788,674 | 11/1988 | Maeda et al. | 369/54 |
| 4,789,975 | 12/1988 | Taniyama | 369/44.26 |
| 4,896,311 | 1/1990 | Ishihara | 369/50 X |
| 4,989,195 | 1/1991 | Suzuki | 369/50 |
| 5,001,692 | 3/1991 | Farla et al. | 369/48 |
| 5,072,435 | 12/1991 | Bakx | 369/116 |
| 5,089,999 | 2/1992 | Ishida et al. | 360/77.06 |
| 5,136,569 | 8/1992 | Fennema et al. | 369/54 X |
| 5,155,722 | 10/1992 | Yoshida | 369/116 |
| 5,289,451 | 2/1994 | Ashinuma et al. | 369/54 X |

OTHER PUBLICATIONS

ISO/IEC 10089:1991, pp. 31–34.

*Primary Examiner*—W. R. Young
*Assistant Examiner*—Thang V. Tran
*Attorney, Agent, or Firm*—Wolf, Greenfield & Sacks

[57] ABSTRACT

An optical disc recording apparatus which records data with a second rotation frequency on an optical disc containing a preliminarily written recording condition in relation to a first rotation frequency. The optical disc recording apparatus preliminarily possesses recording condition in relation to the first and second rotation frequencies. The optical disc recording apparatus initially reads the recording condition in relation to the first rotation frequency, and then, in accordance with the read-out recording condition in relation to the first rotation frequency and the stored recording condition in relation to the first and second rotation frequencies, the recording apparatus computes the recording condition applicable to the optical disc in relation to the second rotation frequency. Finally, the optical disc recording apparatus records data on the optical disc by applying the computed recording condition. In consequence, even when the recording condition in relation to the second rotation frequency is not yet known, the apparatus can securely execute the data recording operation.

20 Claims, 5 Drawing Sheets

OPTICAL DISC RECORDING APPARATUS

BACKGROUND OF THE INVENTION

1. Field of the Invention

The present invention relates to an optical disc recording apparatus which records data on an optical disc standardized by the International Standard Organization (ISO), more particularly, the invention relates to a technique of controlling recording power available for recording data on those optical discs having different recording sensitivity in the ISO standard.

2. Description of Related Art

Today, an optical disc serving itself as interchangeable recording medium containing vase potential capacity has attracted growing attention of all the concerned. Actually, the optical disc is applied to a wide variety of uses typically including the recording of image data for example. The international Standard organization sequentially standardizes a variety of optical discs including the one having 130 mm of diameter.

Figure 1:
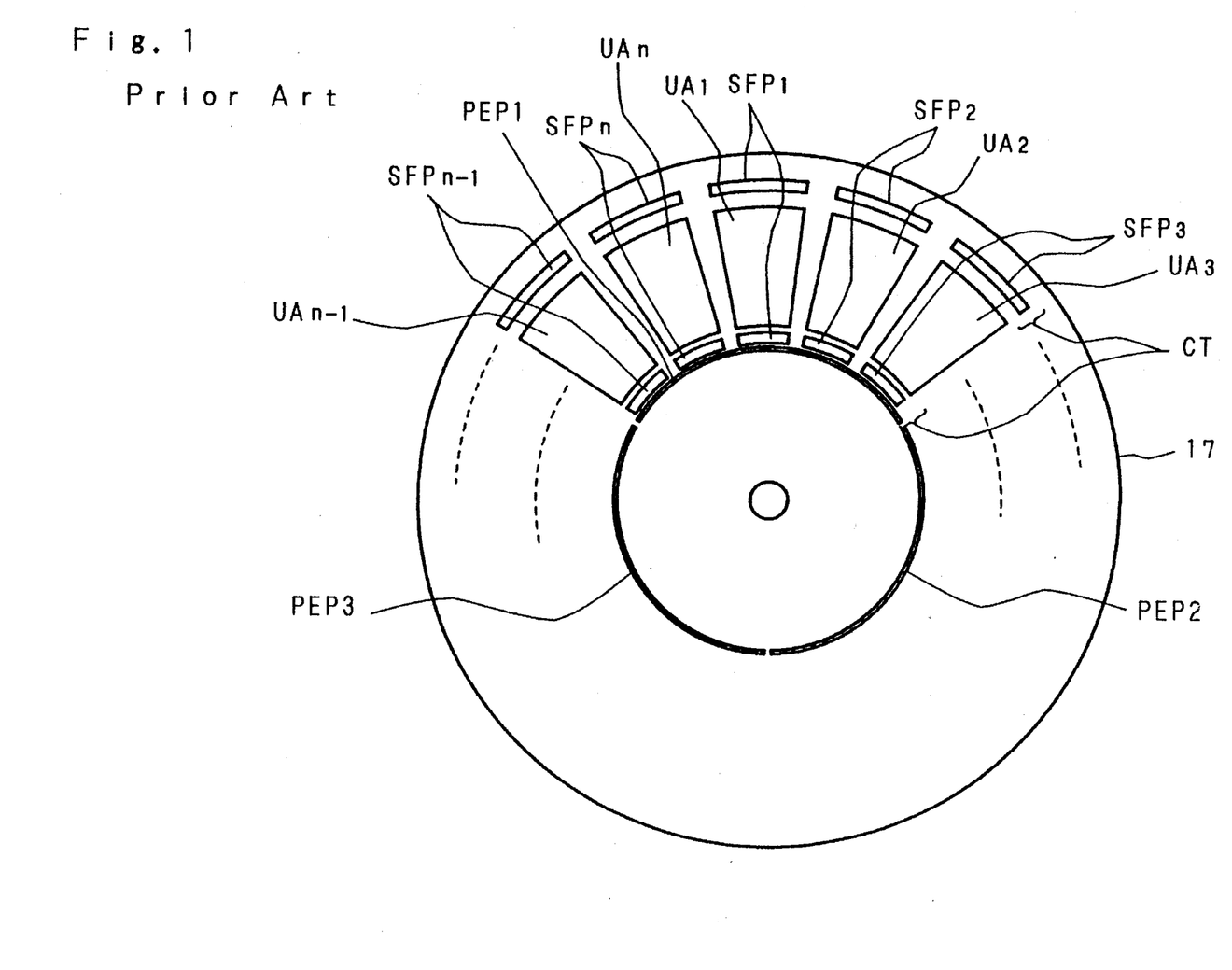
FIG. 1 schematically designates the block diagram of areas provided for an ISO-standard optical disc.

FIG. 1 schematically designates composition of data recording areas of an ISO-standard optical disc 17. The regions called "control tracks" in which the control data is recorded are compulsorily provided on the internal and external circumferential surfaces of the optical disk 17. A plurality of regions called "phased encoded parts (PEP)" are provided on an annular region between radiuses 29 mm through 29.5 mm of the control tracks CT on the side of the internal circumference. On the other hand, a plurality of regions called "standard format parts (SFP)" are provided on one annular region between radiuses 29.52 mm through 29.7 mm and the other annular region between radiuses 60.15 mm through 60.5 mm of the control tracks CT on the internal and external circumferential surfaces. The regions sandwiched by the control track CT on the side of the internal circumference and the other control track CT on the side of the external circumference are user areas.

There are three regions of the "phased encoded part (PEP)" including PEP1, PEP2 and PEP3, each preliminarily being formulated by triplicated 18 bytes. However, no track slit is provided for these regions PEP1, PEP2 and PEP 3, and yet, unlike the user areas, control data are preliminarily recorded thereon with sparse density. A variety of coded data containing inverted phases are preliminarily recorded on these PEP1, PEP2 and PEP3, where these coded data include identification data to discriminatively identify the recording format whether being the "additional data writing type" or the "magneto-optic type". The phase-inverted-code recorded data also includes the data for reading the "standard format part (SFP)" and the vendor code. For example, the optical disc format data is recorded in the upper 4 bits of the byte 7 of the PEP regions. While the "additional data writing mode" is underway, all the predetermined bits 5 respectively remain to be "1".

A plurality of "standard format part" including $SFP_1$ through $SFP_n$ (where "n" designates the number of sector) are preliminarily formulated every sector in the annular region between radiuses 29.52 mm through 29.7 mm that follow PEP1, PEP2 and PEPS of the control track CT and also in the annular region between radiuses 60.15 mm through 60.5 mm. Those SFP regions respectively contain track slits in which the recording and reproducing data are respectively recorded with the density identical to that in the user areas. Those SFP regions are provided by way of equally dividing the tracks in the direction of the inner circumference. For example, the ISO standard prescribes the number "n" of sector to be either 17 or 31. When there are 17 sectors, each of these sectors has 1024 bytes of the user data area. On the other hand, when there are 31 sectors, each sector has 512 bytes of the user data area.

Each SFP regions has 512 bytes when n is 31. Of these, data duplicated from the PEP regions are recorded in 18 bytes which ranges from byte 0 through byte 17. Medium data for the recording and reproducing of the optical disc are recorded in 366 bytes which ranges from the 18th byte to the 383rd byte. System data like the number of byte of the user area are recorded in 64 bytes which ranges from the 384th byte to the 477th byte. The remaining bytes ranging from the 448th byte to the 511th byte are respectively reserved for the introduction of further standards in the future and any contingent standard other than the anticipated ISO standards.

The detail of the composition of those functional regions of the ISO-standard optical disc as per the above description is shown in Table 1, on page 42, 16.4.3.2, of the ISO/IEC DIS 10089:1991.

Conditions of the reflectivity and the intensity of light against three kinds of laser beam wavelength are respectively predetermined in reference to the regions containing the recorded medium data. The light intensity is specified against a variety of laser beam wavelength relative to the rotation frequency of the four kinds of optical discs. Concretely, a total of 12 degrees of the light intensity are prescribed by the ISO standard. Furthermore, additional conditions are prescribed on the light intensity. Concretely, when a constant pulse width system is introduced, three kinds of specifications are applied to the radius available for the recording area. When three kinds of pulse width are made available, a total of 9 kinds of conditions are prescribed on the light intensity. In addition, when a constant power system is introduced, four kinds of conditions containing the light intensity and three kinds of radiuses. As is done for conditioning the recording requirements, specific data on the data erasing condition is also stored in those SFP regions. Concretely, when introducing a constant pulse width system, the SFP regions respectively store data for conditioning the light intensity during the recording and erasing modes to rule those requirements including the following; three kinds of the combination of wavelength ($\lambda 1$ through $\lambda 3$) with the reflectivity, four kinds of the rotation frequencies of the optical disc (N1 through N4), three kinds of radiuses (30 mm, 45 mm, and 60 mm) of the optical disc, and three kinds of pulse width (T×1.0, T×0.5, and T×0.25), respectively.

Incidentally, the ISO standard also prescribes the entry of the standard recording condition when merely introducing one kind of the laser beam wavelength ($\lambda 1=825$ nm) and the rotation frequency of the optical disc (N1=1,800 r.p.m.). On the other hand, it is optional to write the recording condition when applying other wavelength including $\lambda 2$ and $\lambda 3$ and other rotation frequencies of the optical disc (N2, N3 and N4). In other words, if the recording condition compatible with the rotation frequency of the optical disc recording apparatus were not written in the optical disc itself, no data can be recorded on this optical disc at all.

Furthermore, even when using an optical disc fully compatible with the ISO standard, recording sensitivity like thermal capacitance of recording layer may contingently differ from each other. As a result, even when rotating the optical disc based on the rotation frequency identical to other optical discs, recording condition differs from each disc having different recording sensitivity. In consequence, compared to other recording media like a floppy disc or a magnetic disc, those optical discs conforming to the ISO standard cannot perfectly be interchangeable. In other words, even when those recording conditions compatible with the rotation frequency of the optical disc recording apparatus are properly written in each optical disc, the recording condition still lacks in enough flexibility, and thus, the data recording operation cannot be executed under the optimal condition.

SUMMARY OF THE INVENTION

The invention overcomes those problems mentioned above by providing a novel optical disc recording apparatus which characteristically records data with a second rotation frequency on an optical disc containing the recording condition data preliminarily written in relation to a first rotation frequency. In order to securely achieve the above object, the invention provides a novel optical disc recording apparatus characteristically comprising means for possessing a preliminarily known recording condition designated for recording data on an optical disc in relation to the first and second rotation frequencies, means for reading the recording condition in relation to the first rotation frequency preliminarily written in an objective optical disc, means for computing the recording condition for the objective optical disc in relation to the second rotation frequency on the basis of the read-out recording condition in relation to the first rotation frequency and the recording condition preliminarily stored first and second rotation numbers and means for recording data on the objective optical disc based on the computed recording condition.

When recording data on an optical disc with the second rotation frequency in such a state in which the recording condition in relation to the first rotation frequency is preliminarily written in the optical disc, the optical disc recording apparatus preliminarily possesses the recording condition in relation to the first and second rotation frequencies, and then reads the preliminarily written recording condition in relation to the first rotation number. Next, based on the read-out recording condition in relation to the first rotation number and also based on the stored recording condition in relation to the first and second rotation frequencies, the optical disc recording apparatus computes the recording condition in relation to the second frequency which is applicable to the optical disc. Finally, the optical disc recording apparatus records data on the optical disc based on the computed recording condition. In consequence, even though the recording condition in relation to the second rotation frequency is not yet known, the optical disc recording apparatus can securely execute the data recording operation.

One object of the invention is to provide a novel optical disc recording apparatus which is capable of executing the recording operation on the optical disc even when the recording condition in relation to the second rotation frequency is not yet known.

A still further object of the invention is to provide a novel optical disc recording apparatus which is capable of securely promoting the interchangeability between those optical discs each containing different recording sensitivity.

The above and further objects and features of the invention will more fully be apparent from the following detailed description with accompanying drawings.

BRIEF DESCRIPTION OF THE DRAWINGS

FIG. 4(*a*) and 4(*b*) designate the operational flowchart describing the data recording processes sequentially executed by the optical disc recording apparatus embodied by the invention.

DESCRIPTION OF THE PREFERRED EMBODIMENTS

Referring now to the accompanying drawings, an optical disc recording apparatus according to an embodiment of the invention is described below.

Figure 2:
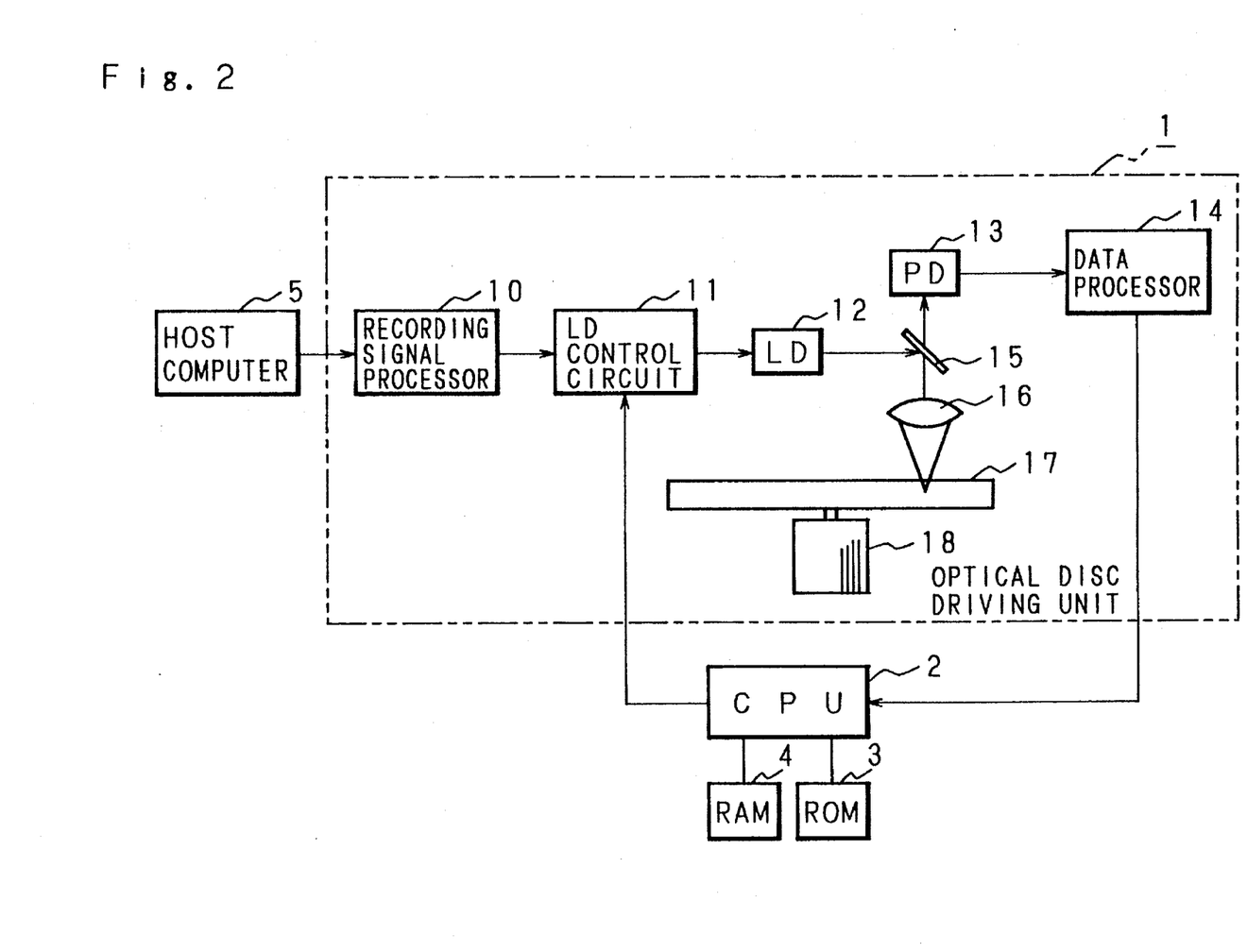
FIG. 2 schematically designates the simplified block diagram of the optical disc recording apparatus according to an embodiment of the invention.

FIG. 2 schematically designates the simplified block diagram of the optical disc recording apparatus according to an embodiment of the invention. The reference numeral 1 shown in FIG. 2 designates an optical disc driving unit. A CPU 2 controls signals outputted from a laser diode 12. An external host computer 5 delivers recording signals to the optical disc driving unit 1. Recording signals are then delivered to a recording signal processor 10 inside of the optical disc driving unit 1. The recording signal processor 10 adds an error correction signal to those recording signals, and then applies 2–7 modulation to the recording signals added with the error correction signal. Next, the 2–7 modulated recording signals are delivered to a laser diode control circuit 11. Using the 2–7 modulated recording signals, the laser diode control circuit 11 modulates signals before delivering them to the laser diode 12. At the same time, in response to the control signal outputted from the CPU 2, the laser diode control circuit 11 controls recording power, erasing power, reproducing power and so on. The laser diode 12 emits laser beam (which contains 780 nm of wavelength and substantially corresponds to the output from the laser diode control circuit 11) to an optical disk 17 in the form of spot beam via a beam splitter 15 and an object lens 16.

The optical disc 17 shown in FIG. 2 is rotated by a drive motor 18 at 2,400 r.p.m. of constant speed. While the data reproduction mode is underway, laser beam reflected by the optical disc 17 is detected by a photodetector PD 13 via the object lens 16*b* and the beam splitter 15. The data processor 14 demodulates the reproducible signals. Next, the demodulated reproducible signals are once delivered to RAM 4 via the CPU 2. The CPU 2 is operated by effect of program stored in ROM 3. In response to control data stored in the control track CT of the optical disc 17, the CPU 2 executes the predetermined functional operations to properly control the laser diode control circuit 11 so that predetermined data can properly be recorded on the loaded optical disc 17 by applying optimal recording power.

The loaded optical disc 17 contains data regions, where the composition of these data regions is exactly identical to that shown in FIG. 1. As mentioned earlier, the optical disc 17 as per the ISO standard may merely contain the limited standard recording condition including 825 nm of laser beam wavelength and 1,800 r.p.m. of the rotation frequency without any additional content of the recording condition. On the other hand, even though such additional recording conditions were also contained, in many cases, only proper values per drive are designated as the recording condition. Since these proper values are different from the one yielded from the standard measuring condition, reliability may not always be secured well.

According to the optical disc recording apparatus embodied by the invention, when using any of those optical discs manufactured by others, or if there were no recording data in those regions including $SFP_1$ through $SFP_n$ for the recording operation to be performed in relation to 2,400 r.p.m. of the rotation, then, based on the recording data available for the recording operation performed in relation to 1,800 r.p.m. of the rotation, the optical disc recording apparatus executes the recording operation by applying a specific mode capable of achieving optimal recording power at 2,400 r.p.m. of the rotation. On the other hand, when using the optical disc recording apparatus manufactured by the manufacturer himself, it is possible for this optical disc recording apparatus to execute the recording operation by applying the recording power value specified by the ROM 3.

Figure 3:
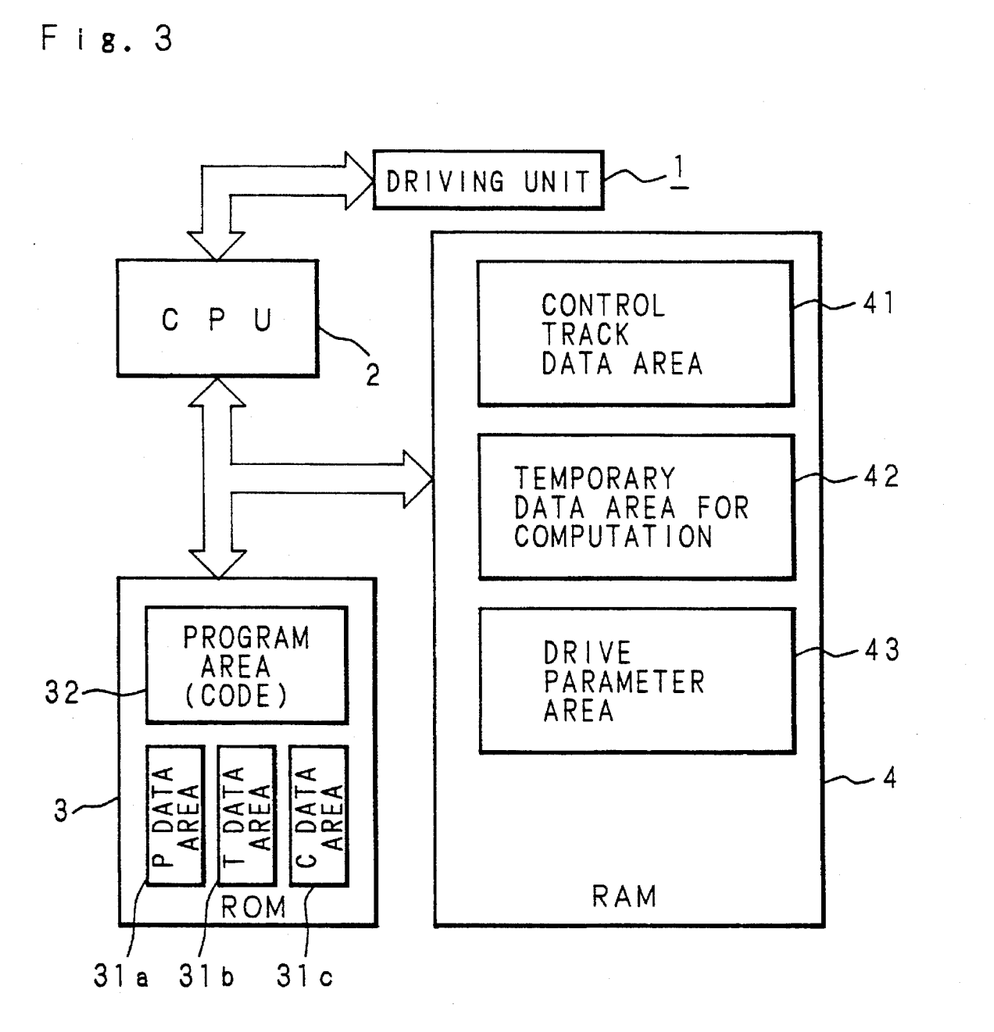
FIG. 3 schematically designates the simplified block diagram of the ROM and the RAM shown in FIG. 2.

FIG. 3 designates the block diagram of those functional areas provided inside of the ROM 3 and the RAM 4. The ROM 3 comprises a program area 32 which stores a program for computing laser beam power (intensity of laser beam) applied to either the recording operation or the erasing operation respectively making up the recording conditions applicable to the optical disc 17 and data areas including P data area 31a, T data area 31b, and C data area 31c, which respectively store the recording power/erasing power (mW) and the width of recording pulse width (nsec.) applied to the optical disc 17 containing the known recording condition; and coefficient C (of the equation (1) which is shown later on) which designates a certain characteristic common to all the optical discs. The ROM 3 stores those values of the recording power and the erasing power based on the application of 1,800 r.p.m. and 2,400 r.p.m. of the rotation speed. In addition, the ROM 3 also stores 5-step values (47, 57, . . . 97n) of the recording pulse width available for executing a recording operation in the direction from the inner circumference to the outer circumference.

On the other hand, the RAM 4 comprises a control track data area 41 which stores control data in regions $SFP_1$ through $SFP_n$ of the control track CT of the optical disc 17 subject to a recording operation; a temporary data area for computation 42 which provisionally stores data applicable to the computation of the recording power and the erasing power to be described later on; and a drive parameter area 43 which stores the computed data on the recording power and the erasing power and the data on the recording pulse width available for the recording operation. The CPU 2 reads the drive parameter from the drive parameter area 43, and then delivers it to the laser diode control circuit 11. Based on the received drive parameter, the laser diode control circuit 11 properly controls the recording power, the erasing power and the recording pulse width available for the laser diode 12.

Figure 4A:
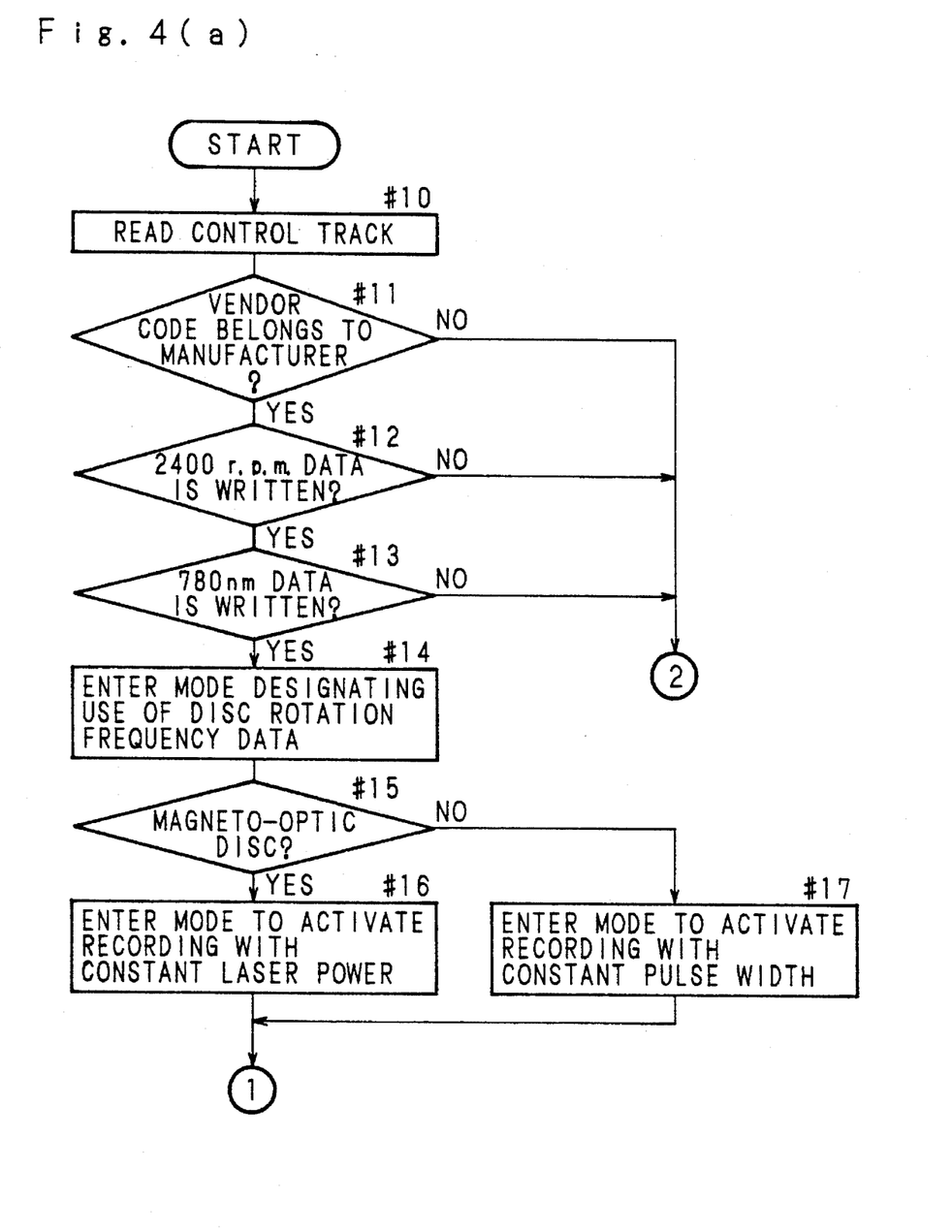
Figure 4B:
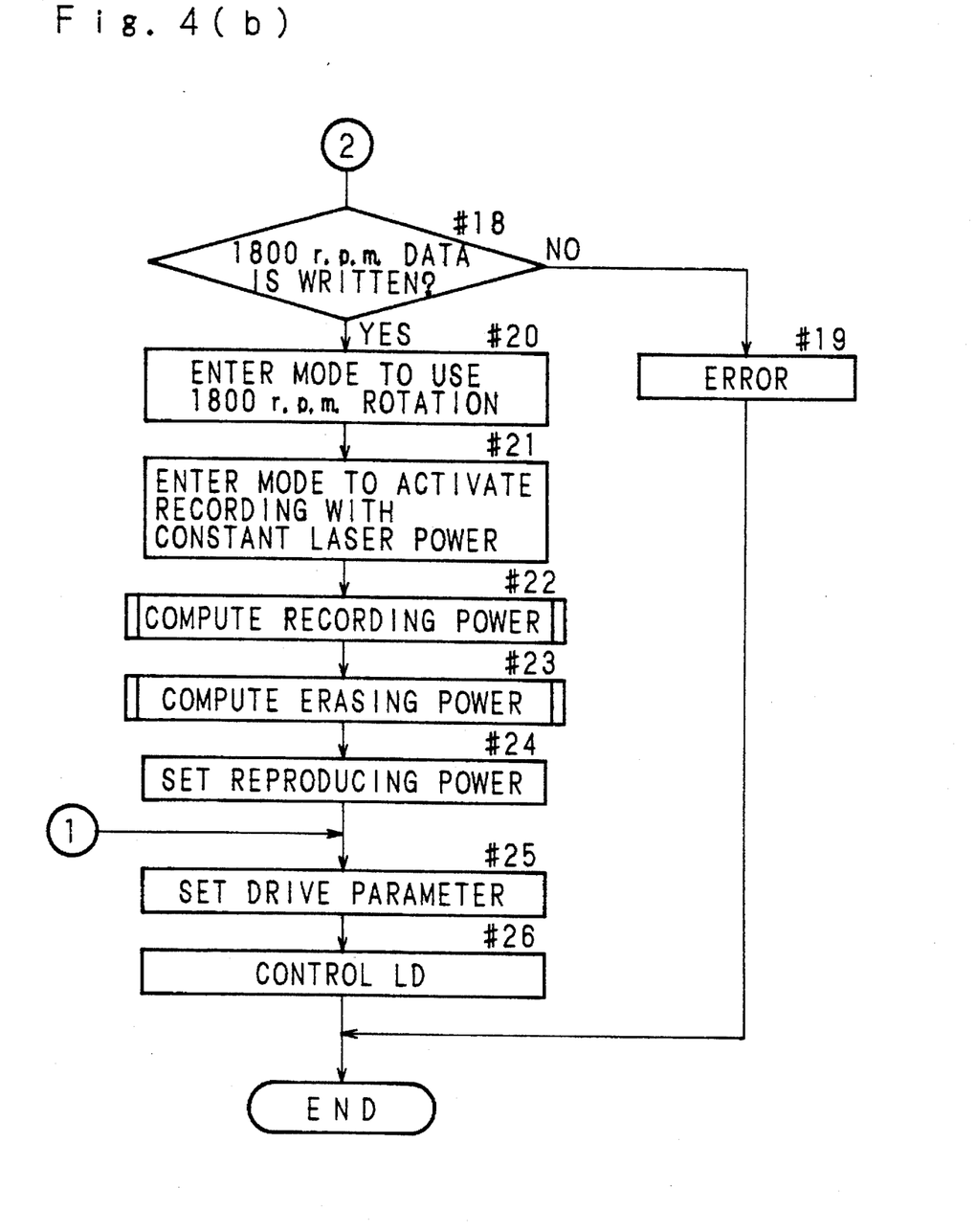

Next, referring to the operational flowchart shown in FIG. 4(a), 4(b), the whole sequential processes for executing the data recording operation with the optical disc recording apparatus of the invention are described below.

Simultaneous with the activation of the operation of the optical disc recording apparatus, initial step #10 is entered, in which the CPU 2 reads the data of the control track CT of the loaded optical disc 17, and then stores this data in the RAM 4. Next, step #11 is entered, in which the CPU 2 checks those regions PEP 1 through PEP 3 to see if the verdor code belongs to the manufacturer himself, or not. If the vendor code is identified to be the manufacturer's own code, then step #12 is entered, in which the CPU 2 checks to see if the data in relation to 2,400 r.p.m. of the rotation frequency is already written in those regions $SFP_1$ through $SFP_n$, or not. If the entry of this data in those SFP regions is identified, then step #13 is entered, in which the CPU 2 checks to see if the data in relation 780 nm of laser pulse wavelength is already written in those regions $SFP_1$ through $SFP_n$, or not. If the entry of this data in relation to 780 nm of laser pulse wavelength is identified, all the recording conditions needed for the optical disc driving unit 1 are fully satisfied, and then step #14 is entered, in which the CPU 2 sets an operating mode to use the driving data in relation to 2,400 r.p.m. stored in the ROM 3 as the drive parameter.

Next, based on the data present in those regions PEP1 through PEP3, the CPU 2 checks to see of the loaded medium is substantially a magneto-optic disc, or not. If the presence of the magneto-optic disc is identified, then step #16 is entered, in which the CPU 2 sets an operating mode to activate recording with constant laser power. If the presence of the additional data writing disc is identified, then step #17 is entered, in which the CPU 2 sets an operating mode to activate recording with constant pulse width. As a result, the operating mode proceeds to step #25 which is to be described later on.

On the other hand, if no entry of data is identified while the step #11, or #12, or #13, is underway, then step #18 is entered, in which the CPU 2 checks to see of the data designated for driving the optical disc at 1,800 r.p.m. of the rotation frequency is already written in those regions $SFP_1$ through $SFP_n$, or not. If no entry of this data is identified, then it indicates deviation from the ISO standard. As a result, step #19 is entered to perform error procedure before eventually completing the whole processes.

On the other hand, if the entry of the data designated for driving the optical disc 17 at 1,800 r.p.m. of the rotation frequency is identified, then step #20 is entered, in which the CPU 2 sets an operating mode to compute the drive parameter in relation to 2,400 r.p.m. of the rotation frequency by applying the data written in the control track CT designated for driving the optical disk 17 at 1,800 r.p.m. of the rotation frequency. Next, step #21 is entered, in which the CPU 2 sets an operation mode to activate recording with constant laser power. Next, step #22 is entered, in which the CPU 2 computes an optimum recording power in relation to 2,400 r.p.m. of the rotation frequency.

Next, the method of concretely computing the recording power is described below. The CPU 2 computes the recording power by applying the equation (1) which designates specific characteristic common to all the optical discs.

$$P = C \left( \frac{1}{T} + \frac{1}{\sqrt{T}} \right) \quad (1)$$

where P designates the recording power (mW), C coefficient, and T designates the recording pulse width (nsec.).

Assume that the recording power, the recording pulse width at the innermost circumference and the related coefficient derived from the above equation (1) in relation to 1,800 r.p.m., which are stored in data areas 31a, 31b and 31c, are determined to be "P18M", "T18M" and "C18M" respectively, the recording power, the recording pulse width at the innermost circumference and the related coefficient in relation to 2,400 r.p.m., are determined to be "P24M", "T24M" and "C24M", respectively.

Also assume that the recording power, the recording pulse width at the innermost circumference and the related coefficient which are initially written in the control track CT of the optical disc 17 as per the ISO standard available for recording data with the optical disc recording apparatus of the invention at 1,800 r.p.m. of the rotation frequency and are stored in the RAM 4, are determined to be "P18I", "T18I" and "C18I" respectively. And assume that the recording power, the recording laser pulse width at the innermost circumference and the related coefficient, which are needed for driving the optical disc 17 at 2,400 r.p.m. of the rotation frequency, are determined to be "P24I", "T24I" and "C24I".

First, the CPU 2 reads the recording power "P18I" and the recording pulse width "T18I" from the RAM 4, and then computes the coefficient "C18I" from the equation (1), and then stores the coefficient "C18I" in the temporary data area for computation 42 of the RAM 4.

$$C18I = P18I \left( \frac{1}{T18I} + \frac{1}{\sqrt{T18I}} \right) - 1$$

Next, the CPU 2 computes another coefficient "C24I" from the above coefficient "C18I" and those coefficients "C18M" and "C24M" stored in the C data area 31c of the ROM 3, and then also stores the coefficient "C24I" in the temporary data area for computation 42 of the RAM 4.

$$\frac{C18I}{C18M} = \frac{C24I}{C24M} \quad C24I = \frac{C18I}{C18M} \times C24M$$

Next, using the computed coefficient "C24I", the CPU 2 determines the recording power "P24I" at 2,400 r.p.m. of the rotation frequency from the equation (1) shown above.

$$P24I = C24I \left( \frac{1}{T24I} + \frac{1}{\sqrt{T24I}} \right)$$

Since the recording pulse width "T24I" can use the other recording pulse width "T24M" available for activating 1,800 r.p.m. of the rotation frequency, the optimal power "P24I" available for the recording operation can be determined by applying the equation shown below.

$$P24I = C24I \left( \frac{1}{T24I} + \frac{1}{\sqrt{T24I}} \right)$$

Next, while step #23 is underway, the CPU 2 computes the erasing power "PE24I" by applying the equation shown below.

$$PE24I = \frac{C18I}{C18M} \times PE24M$$

The erasing power "PE24M" is previously stored in the P data area 31a of the ROM 3. The coefficient "C18I" determined in the course of computing the recording power is used.

Alternatively, the erasing power "PE24I" may also be computed by applying the equation shown below.

$$PE24I = \frac{PE18I}{PE18M} \times PE24M$$

Unlike the data recording characteristic, no critical condition is applied to the data erasing operation. Therefore, independent of the inherent characteristic of the optical disc 17, the system embodied by the invention can effectively erase data merely by applying a moderate amount of erasing power without necessarily executing correction.

After completing those computing processes shown above, operating mode proceeds to step #24, in which the CPU 2 writes the reproducing power "PR24I" in the drive parameter area 43 for entry. The value available for the reproducing power "PR24I" substantially corresponds to the one which is written in the control track CT when activating 1,800 r.p.m. of the rotation frequency.

Next, step #25 is entered, in which the CPU 2 conjunctionally writes those computed data values in the drive parameter area 43 for entry, where these computed data values include the recording power "P24I", the erasing power "PE24I", the recording pulse width "T24I" (="T24M") at the innermost circumference of the optical disc 17, and those fourstep recording pulse width. Next, the final step #26 is entered, in which the CPU 2 reads data from the drive parameter area 43 of the RAM 4, and then delivers the read-out data to the laser diode control circuit 11 to properly control the laser power in the course of executing the data recording operation, data erasing operation, and the data reproducing operation.

The above description of the optical disc recording apparatus embodied by the invention has solely referred to the data recording operation based on the emission of constant laser power. Nevertheless, the optical disc recording apparatus embodied by the invention is also effectively applicable to the data recording operation by applying constant pulse width which is normally available for the additional data writing optical discs. In this case, the apparatus embodied by the invention effectively meets the above requirement by computing the recording power along the innermost circumference or the outermost circumference as was done for the above embodiment, and then computes the recording power along the opposite circumference by multiplying either the innermost recording power or the outermost recording power by coefficient.

Furthermore, the above description of the optical disc recording apparatus embodied by the invention has solely referred to such an optical disc which merely records and erases data. Nevertheless, the invention is also effectively applicable to such an optical disc recording apparatus which directly executes a superimposed recording of data by modulating laser beam into high-and-low level dual intensity.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An optical disc recording apparatus for recording data on an optical disc on which data-recording parameters for a first rotation frequency are written, said disc rotating at a second rotation frequency which is different from the first rotation frequency, apparatus comprising:

storage means for storing data-recording parameters for first and second rotation frequencies;

means for reading said data-recording parameters for the first rotation frequency written on said optical disc;

computing means for computing data-recording parameters for the second rotation frequency based on the read-out data-recording parameters for the first rotation frequency and on the stored data-recording parameters for the first and second rotation frequencies; and means for recording data on said optical disc at the second rotation frequency according to the computed data-recording parameters for the second rotation frequency.

2. An optical disc recording apparatus as set forth in claim 1, wherein a data recording operation is executed by irradiating said optical disc with laser beam, and wherein said data-recording parameters include power and pulse width of said laser beam for executing the data recording operation.

3. An optical disc recording apparatus as set forth in claim 2, wherein said storage means comprises:

first storage means for storing the power of the laser beam for said first and second rotation frequencies;

second storage means for storing the pulse width of the laser beam for said first and second rotation frequencies; and third storage means for storing a coefficient which relates said power and said pulse width for said first and second rotation frequencies.

4. An optical disc recording apparatus as set forth in claim 3, wherein the coefficient, power, and pulse width are related as follows:

$$P = C \left( \frac{1}{T} + \frac{1}{\sqrt{T}} \right)$$

where P designates power, C coefficient, and T designates pulse width.

5. An optical disc recording apparatus as set forth in claim 3, wherein said computing means comprises:

fourth storage means for storing a first coefficient which relates the power and the pulse width of the laser beam for the first rotation frequency, said coefficient computed on the basis of the read-out data-recording parameters for the first rotation frequency of said optical disc; wherein the computing means computes a second coefficient for the second rotation frequency of said optical disc based on the coefficients stored in said third and fourth storage means, and for computing the power of the laser beam for the second rotation frequency of said optical disc on the basis of the second coefficient.

6. An optical disc recording apparatus as set forth in claim 5, wherein the coefficient, power, and pulse width are related as follows:

$$P = C \left( \frac{1}{T} + \frac{1}{\sqrt{T}} \right)$$

where P designates power, C coefficient, and T designates pulse width.

7. An optical disc recording apparatus as set forth in claim 5, wherein said computing means comprises:

fifth storage means for storing the read-out data-recording parameters for the first rotation frequency; and sixth storage means for storing the computed power of the laser beam.

8. An optical disc recording apparatus as set forth in claim 1, wherein said optical disc is manufactured in accordance with standards established by the International Standard organization.

9. An optical disc recording apparatus as set forth in claim 8, wherein said first rotation frequency substantially designates 1,800 revolutions per minute.

10. An optical disc recording apparatus as set forth in claim 9, wherein said second rotation frequency substantially designates 2,400 revolutions per minute.

11. An optical disc recording apparatus as set forth in claim 1 wherein the storage means includes a ROM.

12. A method for recording on an optical disc with a recording apparatus which has memory for storing information including parameters, a read head for reading data from the disc, and the ability to record data on the optical disc, said method comprising the following steps:

reading data recording parameters for a first rotation frequency from an optical disc;

determining whether data is to be written on the optical disc at the first rotation frequency or at a second rotation frequency;

recording data on the optical disc based on parameters stored in the memory in response to a determination that data is to be written with the first rotation frequency;

computing data recording parameters based on the read parameters and on a group of parameters stored in memory which include parameters for the first and second rotation frequencies, in response to a determination that data is to be written with the second rotation frequency; and recording data on the optical disc in accordance with the parameters determined in the step of determining data recording parameters in response to a determination that data is to be written with the second rotation frequency.

13. A method as set forth in claim 12 wherein one of the first and second rotation frequencies is 1800 r.p.m., and the other is 2400 r.p.m.

14. A method as set forth in claim 12 wherein the read parameters includes a coefficient, and the stored parameters includes two coefficients, each of the coefficients relating power and pulse width of a laser beam.

15. A method as set forth in claim 14 wherein the step of computing includes:

reading the stored coefficients; and computing a coefficient for the second rotation frequency based on a ratio among the read coefficient for the first rotation frequency and the stored coefficients.

16. An apparatus for recording data on an optical disc, the disc having data recording parameters recorded thereon, the apparatus comprising:

a first memory with stored data recording parameters which are used to record data on the optical disc at first and second frequencies;

a second memory;

a read head for reading data recording parameters from the optical disc;

means for storing the read data recording parameters in the second memory;

a processor which is coupled to the first and second memories, said processor for computing data recording parameters based, at least in part, on the parameters stored in the first and second memories; and means for recording data based on the computed data recording parameters.

17. An apparatus as set forth in claim 16 wherein the first memory is a ROM and the second memory is a RAM.

18. The apparatus of claim 15 wherein the data recording parameters include a parameter related to laser beam power for recording.

19. The apparatus of claim 15 wherein the data recording parameters include a parameter related to pulse width for recording.

20. An apparatus for recording data on an optical disc on which data-recording parameters for a first rotation frequency are written, the disc rotating at a second rotation frequency which is different from the first rotation frequency, the apparatus comprising:

means for storing data-recording parameters for first and second rotation frequencies;

means for reading the data-recording parameters written on the optical disc;

means for computing a coefficient for determining a data-recording parameter for the second rotation frequency based on the read out data-recording parameters and on the stored data-recording parameter; and means for recording data on said optical disc at the second rotation frequency by using a laser beam power derives at least in part on the computed data-recording parameter.

* * * * *